United States Patent [19]
Buckheit et al.

[11] Patent Number: 6,030,244
[45] Date of Patent: *Feb. 29, 2000

[54] CONNECTORS AND METHODS FOR THEIR USE

[75] Inventors: Robert F. Buckheit; Martin D. Rolph, both of Santa Rosa, Calif.; Gerald T. Waltemyer, The Sea Ranch, Calif.

[73] Assignee: BIW Connector Systems, Inc., Santa Rosa, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/902,592

[22] Filed: Jul. 30, 1997

Related U.S. Application Data

[63] Continuation-in-part of application No. 08/619,820, Mar. 15, 1996, abandoned.

[51] Int. Cl.[7] .................................................. H01R 13/28
[52] U.S. Cl. ........................................... 439/291; 439/357
[58] Field of Search .................................. 439/191, 194, 439/195, 291, 293, 352, 357, 358; 213/1.3, 1.6, 76

[56] References Cited

U.S. PATENT DOCUMENTS

| | | | |
|---|---|---|---|
| 420,810 | 2/1890 | Leland | 285/72 |
| 3,195,095 | 7/1965 | Field | 439/195 |
| 3,491,899 | 1/1970 | Cope | 213/159 |
| 3,532,228 | 10/1970 | Beyer | 213/212 |
| 3,591,017 | 7/1971 | Cope | 213/76 |
| 3,773,186 | 11/1973 | Reno | 213/1.3 |
| 3,802,578 | 4/1974 | Farnworth | 213/76 |
| 5,474,465 | 12/1995 | Kobayashi | 439/372 |
| 5,558,534 | 9/1996 | Sarkady et al. | 439/357 |

FOREIGN PATENT DOCUMENTS

| | | |
|---|---|---|
| 0 423 548 A1 | 4/1991 | European Pat. Off. . |
| 1524562 | 11/1968 | France . |
| 1170990 | 5/1964 | Germany . |
| 1242669 | 6/1967 | Germany . |
| 455332 | 10/1936 | United Kingdom . |

*Primary Examiner*—Khiem Nguyen
*Attorney, Agent, or Firm*—Towsend and Townsend and Crew LLP

[57] ABSTRACT

The invention provides exemplary connector systems and methods for their use. In an exemplary embodiment, a connector system is provided which comprises a first and a second connector. In turn, each connector comprises a connector body having a central axis. Each connector further includes a latch spring that is generally aligned with the central axis and includes an offset oriented generally toward the central axis, a lead-in ramp and an inset notch which is oriented generally toward the central axis on a side of the connector body generally opposite to the latch spring. The first and the second connectors may be connected by abutting the connector bodies, with each latch spring being received over the lead-in ramp on the abutting connector and engaging with the inset notch on the abutting connector.

20 Claims, 5 Drawing Sheets

CONNECTORS AND METHODS FOR THEIR USE

CROSS REFERENCE TO RELATED APPLICATIONS

This application is a continuation in part application of U.S. patent application Ser. No. 08/619,820, filed Mar. 15, 1996, now abandoned, the complete disclosure of which is herein incorporated by reference.

BACKGROUND OF THE INVENTION

This invention relates generally to the field of connectors, and more particularly to connectors which may coupled and uncoupled by hand or by pulling apart by application of a prescribed force. In one specific application, the invention relates to connectors which may be used to connect air lines and/or electrical signal and power lines for a rail car braking system.

Current braking systems used on most freight trains in the United States are based on a technology that was developed almost one hundred years ago. Such systems rely on the use of pressurized air to both control and power the brakes. In order to supply pressurized air to the rail cars, an air line is provided along each rail car. When the rail cars are connected, each air line is coupled together to form a single air line running the length of the train. The coupling mechanism generally employed to join each air line is commonly referred to as a "gladhand" coupling and has remained substantially unchanged over the last century.

Gladhand couplings are hermaphroditic, substantially identical, so that either end of a rail car can connect to either end of another rail car. To connect a pair of gladhand couplings, one abuts the couplings adjacent each other and rotates the couplings with their attached air hoses in opposite directions until fully engaged. To prevent the couplings from disconnecting when subjected to vibration, some have a locking device which prevents rotation of the couplings once they have been joined.

Although gladhand couplings have been generally successful in coupling air lines of conventional pneumatic braking systems, such systems have significant drawbacks which have prompted development of newer systems. More particularly, with pneumatic systems braking time is affected by the speed with which air pressure changes travel along the train. For trains having large numbers of rail cars, a significant delay may be experienced while the air travels the length of the train. As a result of this, trains require longer stopping distances and may be prematurely slowed to ensure a safe stop.

Recently, a new braking system has been proposed. The system is referred to a an Electrically-Controlled-Pneumatic (ECP) braking system. The ECP system relies on air to power the brakes, but controls actuation of the brakes electronically. The ECP system therefore requires both air and electrical connections between cars. When ECP systems become fully implemented, the electrical lines which control the brakes may also be used for other signals for controls and data throughout the train. This will logically lead to automatic coupling/decoupling of cars with electronic verification eliminating the necessity and hazard of persons working between rail cars.

Gladhand couplings have a features which make them undesirable for ECP braking systems and unsuitable for automatic coupling/decoupling. Most importantly, they must be rotated to make the air line connection. This rotating action is ill-suited to integrating an electrical connector into the coupling. Further, since rail cars couple/decouple in a push-pull direction, automatic coupling with a connector requiring rotation would be difficult or impossible. Gladhand couplings also require the air to negotiate a 90 degree angle as it passes through the coupling, unnecessarily reducing the efficiency of any ECP system.

One style of integrated air/electrical connectors suitable for use with the ECP system is described in co-pending U.S. application Ser. No. 08/548,993, filed Oct. 27, 1995, the complete disclosure of which is herein incorporated by reference. Although workable, these connectors require twisting of a coupling nut to complete their mating which would be less desirable than a simple push-pull mating, particularly for automatic coupling of rail cars. Also, given the environment in which these connectors must operate, it would be desirable to produce a connector which is less complicated and has fewer parts.

Hence, what is required is an integrated air/electrical connector system consisting of hermaphroditic connectors which mate/unmate either manually or automatically, with the automatic method requiring nothing more than a simple push-pull motion. Any latching method must be sufficiently rigid to avoid unintentional uncoupling while in use.

SUMMARY OF THE INVENTION

The invention provides an exemplary connector which may be connected to another substantially identical connector to form a connector system. The connectors of the invention may be coupled together by merely pressing the connectors together until they interlock. In this way, no rotation of the connectors is required to order to couple the connectors.

The connector system comprises a first and a second connector, with each connector having a connector body. Each connector further includes a flat latch spring mounted to one side of the connector body so that the latch spring is generally aligned with connector body. At one point along its length the latch spring has a formed offset oriented toward the centerline of the connector body when mounted. Also, each connector body has an angled lead-in ramp and an inset notch oriented toward the centerline of the connector body on the side opposite that to which the latch spring is mounted. In this manner, the first and second connectors may be connected by abutting the connector bodies so that the latch springs are received over and engage with the inset notch on the abutting connector.

After the latch springs have completely engaged the inset notches, they become interlocked to secure the connectors together. Once securely connected, the connectors may be disconnected in one of two ways. First, the connectors may be manually disconnected by including a lever in each connector body. The lever has a mechanical advantage to allow one to deflect the latch spring sufficiently to disengage it from the inset notch at which time the connector bodies may be manually separated. In the second alternative, the connectors may be axially pulled apart, with the strength of the latch spring and the shape of the inset notch controlling the amount of force required to pull the two connectors apart. More specifically, as the connectors are pulled axially away from each other, the latch spring deflects to allow the offset in the latch spring to slide up and out of engagement with the inset notch. When the connectors are used to connect air and/or electrical lines for rail cars, the connectors will preferably remain joined until pulled apart with a force that is greater than about three hundred pounds when the air lines are pressurized.

In the ECP brake configuration, each connector will preferably include a central lumen extending therethrough. An air hose is connected to each connector body so that the air hoses are aligned with the central lumen. The connector bodies will preferably each include a resilient gasket that is aligned with the central lumen. In this way, a seal is formed between the two lumens upon connection of the connector bodies. The resilience in the gasket allows for a wide variation in the gap between the two connectors while still providing a sufficient seal between the air lines. Also in the ECP brake configuration, each connector will preferably further include a signal contact. The signal contacts will be disposed on the connector such that they will be joined together upon connection of the connector. The signal contacts employed by the invention may include a variety of different contacts including electrical contacts, fiber-optic contacts, and the like. In the case of the ECP brake configuration, the contacts will be for electrical conductors.

In another exemplary aspect, each connector will preferably be substantially identical to the other connector, or hermaphroditic. Such construction is particularly useful with rail cars which may have either of its two ends connected to another rail car. In another exemplary aspect, each connector will preferably include at least one alignment pin which aligns the connector bodies during connection. The alignment pin(s) further helps keep the connector faces from sliding sideways when the connectors are mated and unmated. Specifically, when the connectors are uncoupled by pulling them apart, such as when train cars uncouple, the latch springs exert a force on the connector which tends to make the connector faces slide sideways, across each other. The alignment pin(s) helps prevent such sliding and therefor protects the electrical contacts.

The invention further provides exemplary methods for coupling and uncoupling the connectors. According to the methods, to couple the connectors, the alignment pins of one connector are roughly aligned with the alignment holes of the second connector and the two connectors are pushed axially toward each other. As this is done, the latch springs are received over and engage with the inset notch of the abutting connector. At this point, the air path has been sealed and the signal contacts have been connected. To uncouple, the connectors are pulled axially away from each other until the latch spring deflects out of engagement with the inset notch and the connectors separate at a prescribed force. At this point, both the air path and the signal contacts have been disconnected. In this way, coupling and uncoupling requires only a simple push and pull force, such as is used when rail cars are pushed together or pulled apart. The forces required to couple/uncouple the connectors are controlled by the stiffness of the latch springs and the shapes of the lead-in ramp and the inset notch. Alternately, the connectors can be uncoupled by manually actuating the release levers and separating the connectors by hand.

DETAILED DESCRIPTION OF THE SPECIFIC EMBODIMENTS

The invention provides methods, systems, and apparatus for coupling various lines such as air lines, electrical lines, fiber-optic lines, and the like. The methods, systems and apparatus allow for such lines to be easily coupled and uncoupled by hand. In addition, such lines may be uncoupled by axially pulling apart the lines to separate the lines at a prescribed force without damage to the lines. The connection between lines is sufficiently stable so that lines will not become disconnected, even when subjected to significant vibration. Although the methods, systems, and apparatus may be employed to connect a variety of lines, they will find their greatest use in connecting air and electrical lines used in conventional pneumatic or in electrically-controlled pneumatic (ECP) braking systems employed by the railroad industry. For convenience of discussion, the connectors of the present invention will be described with reference to freight trains employing ECP braking systems. However, it will be understood that the invention may be useful in a variety of other applications.

Figure 1:
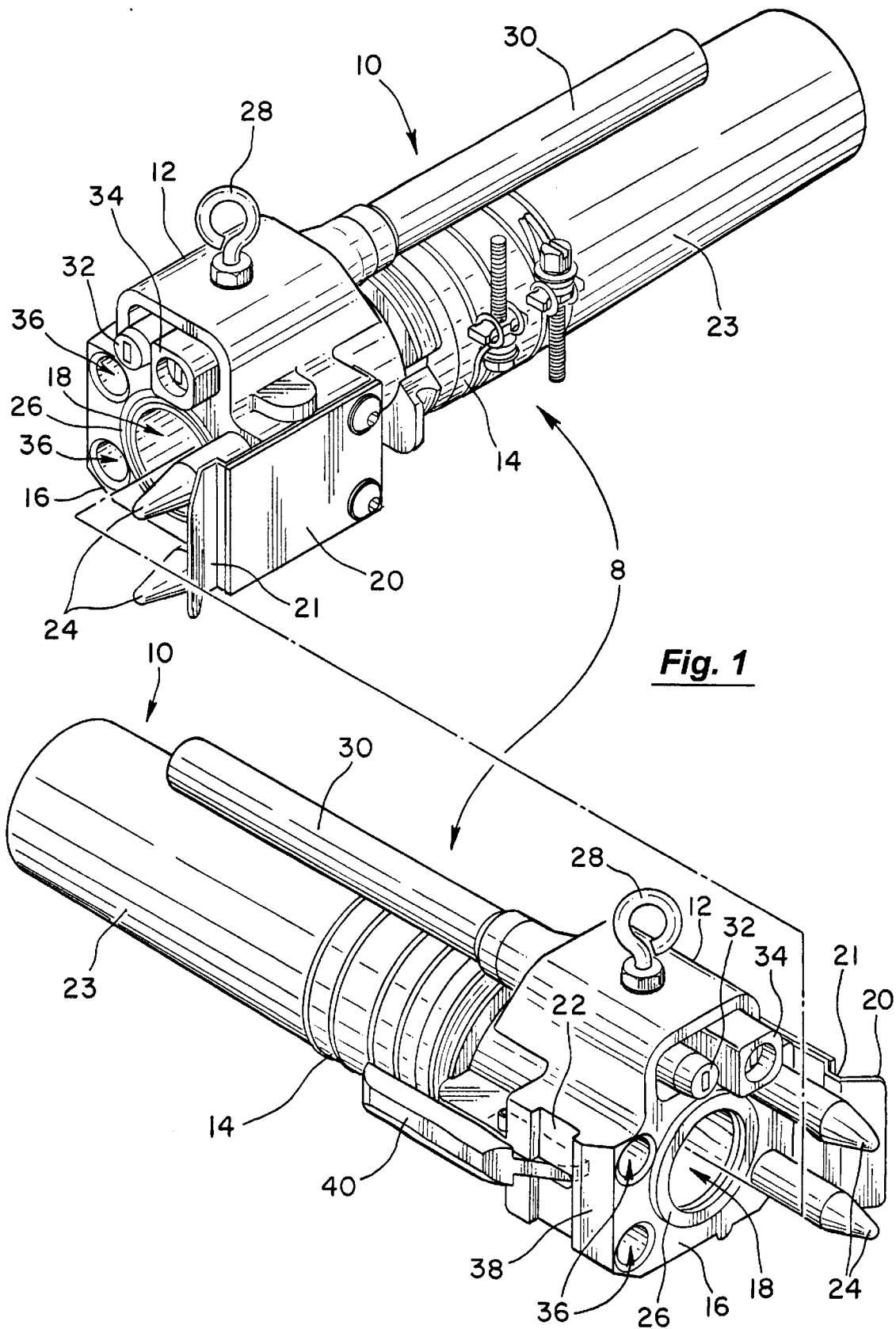
FIG. 1 is a perspective view of an exemplary connector system according to the present invention.

Referring to FIG. 1, an exemplary embodiment of a connector system 8 comprising a pair of connectors 10 will be described. Each connector 10 comprises a connector body 12 having a proximal end 14 and a distal end 16. An axial lumen 18 extends between proximal end 14 and distal end 16. Rigidly attached to connector body 12 is a latch spring 20. Latch spring 20 is generally aligned with the connector body 12 and is attached such that latch spring 20 will resist movement away from its aligned orientation as described in greater detail herein after. Generally opposite of the latch spring 20 is an inset notch 22 in the connector body 12. Latch spring 20 has a formed offset 21 at a point along its length which will mate with the inset notch 22 of an adjoining connector. Latch spring 20 is first deflected by a lead-in ramp 38 on the adjoining connector body 12, then snaps into engagement with the inset notch 22 to interlock therewith.

Proximal end 14 is configured to receive a length of tubing 23, a hose, or the like which supplies compressed air to the train's brakes. Proximal end 14 may alternatively be threaded or otherwise configured to accommodate a mechanical connection. In this manner, compressed air passing through the length of tubing will in turn pass through axial lumen 18 and to an adjoining connector.

Distal end 16 includes a resilient gasket 26. Gasket 26 will mate a corresponding gasket from another connector when attached thereto. As the connectors are drawn together, gasket 26 forms a seal between the connectors to prevent escape of compressed air between the connectors. Gasket 26 is preferably constructed of an elastomeric material, thereby allowing for a wide variation on the gap between mated connectors while still providing an airtight seal.

Attached to connector body 12 by an eyebolt 28 is an electrical conductor 30 having a pair of electrical contacts 32, 34. When connector 10 is mated with another connector, electrical contacts 32, 34 are in turn joined with mating electrical contacts on the adjoining connector so that power and/or signals may be passed through conductor 30. This allows power or electrical signals to be passed car to car when the connectors are engaged. Although shown as an electrical conductor, other signal carrying devices may optionally be used, such as fiber-optics or other conductors capable of carrying signals.

At distal end 16, connector body 12 contains a pair of alignment pins 24 nearest that side of the connector body to which the latch spring 20 is affixed. Opposite the alignment pins 24, nearest that side of the connector body with the inset notch 22, are a pair of alignment holes 36. When two connector bodies are mated, the alignment pins 24 of one connector body 12 will engage the alignment holes 36 of the other connector body 12. The alignment pins are tapered and the alignment holes have a lead-in chamfer to accommodate misalignment during coupling.

The alignment pins perform two functions. First, the alignment pins assist in aligning two connectors as they are joined together. Secondly, the alignment pins keep the connector faces from sliding sideways when the connectors are mated and unmated. For example, when the connectors are uncoupled by pulling them straight apart, such as when train cars uncouple, the connectors will tend to slide sideways relative to each other. If such sliding were allowed, the electrical contacts 32 and 34 would be torn apart.

Figure 2:
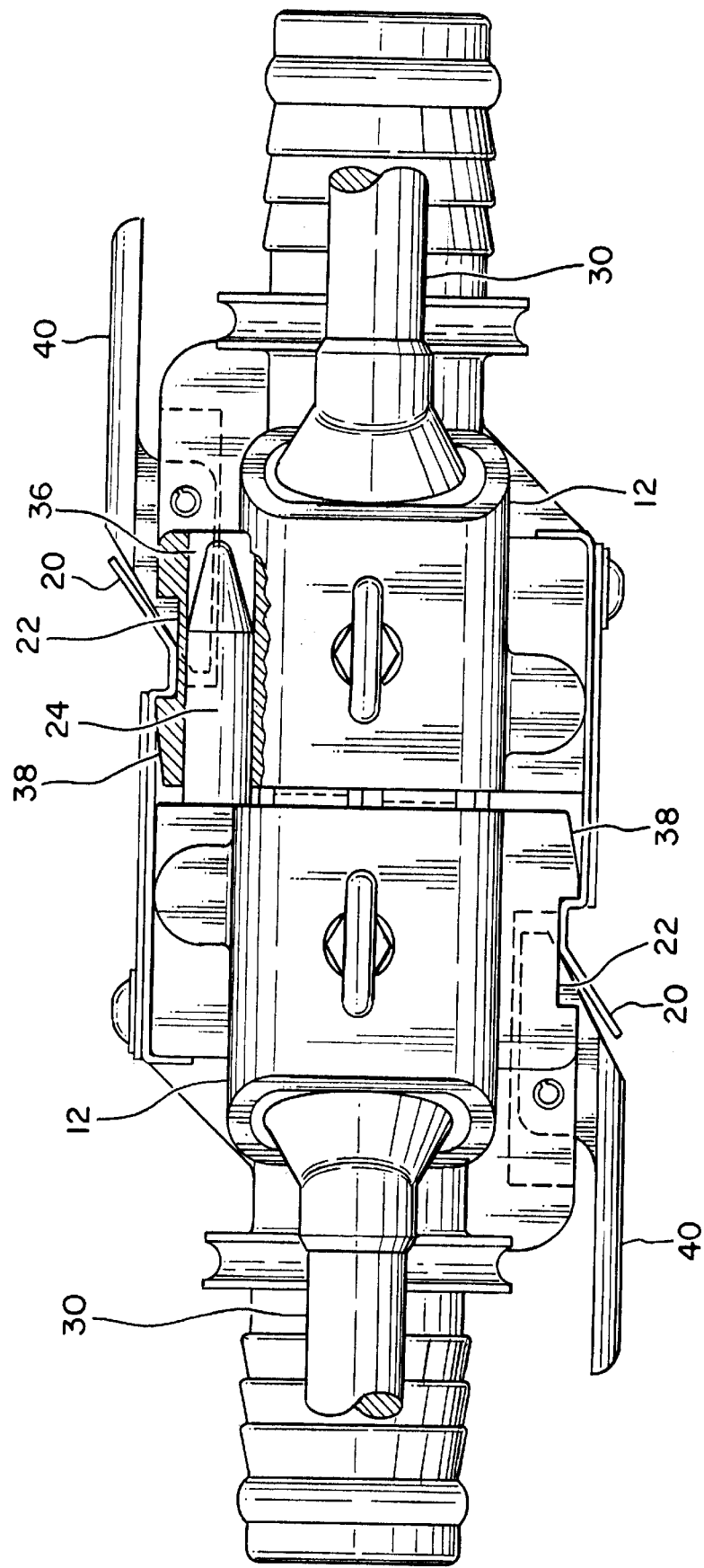
FIG. 2 is a top view of a pair of connectors joined together according to the present invention.
Figure 3:
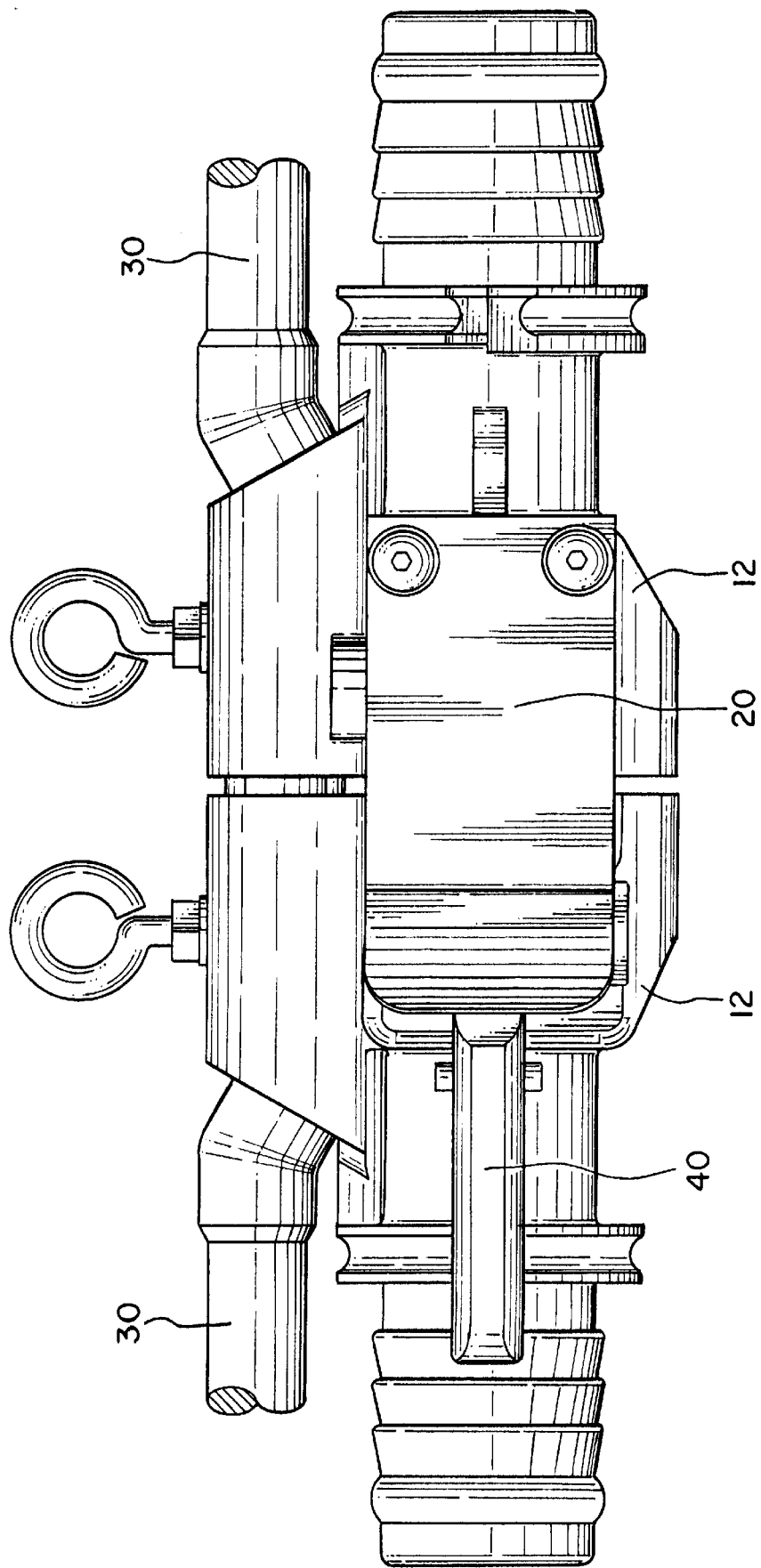
FIG. 3 is a side view of the connectors of FIG. 2.

Referring now to FIGS. 2 and 3, the mating of two connectors 10 will be described. The connectors 10 are hermaphroditic, i.e. essentially identical to each other. For convenience of discussion, the same reference numerals will be employed to describe both connectors. As best shown in FIG. 2 alignment pins 24 engage alignment holes 36 and align the connectors during connection as previously described. As connectors 10 are mated, latch springs 20 are deflected by lead-in ramps 38 until they snap into inset notches 22. When latch spring 20 is received into inset notch 22, connectors are fully mated. When mated, electrical contact 34 is joined with electrical contact 32 of the opposite connector.

Figure 4:
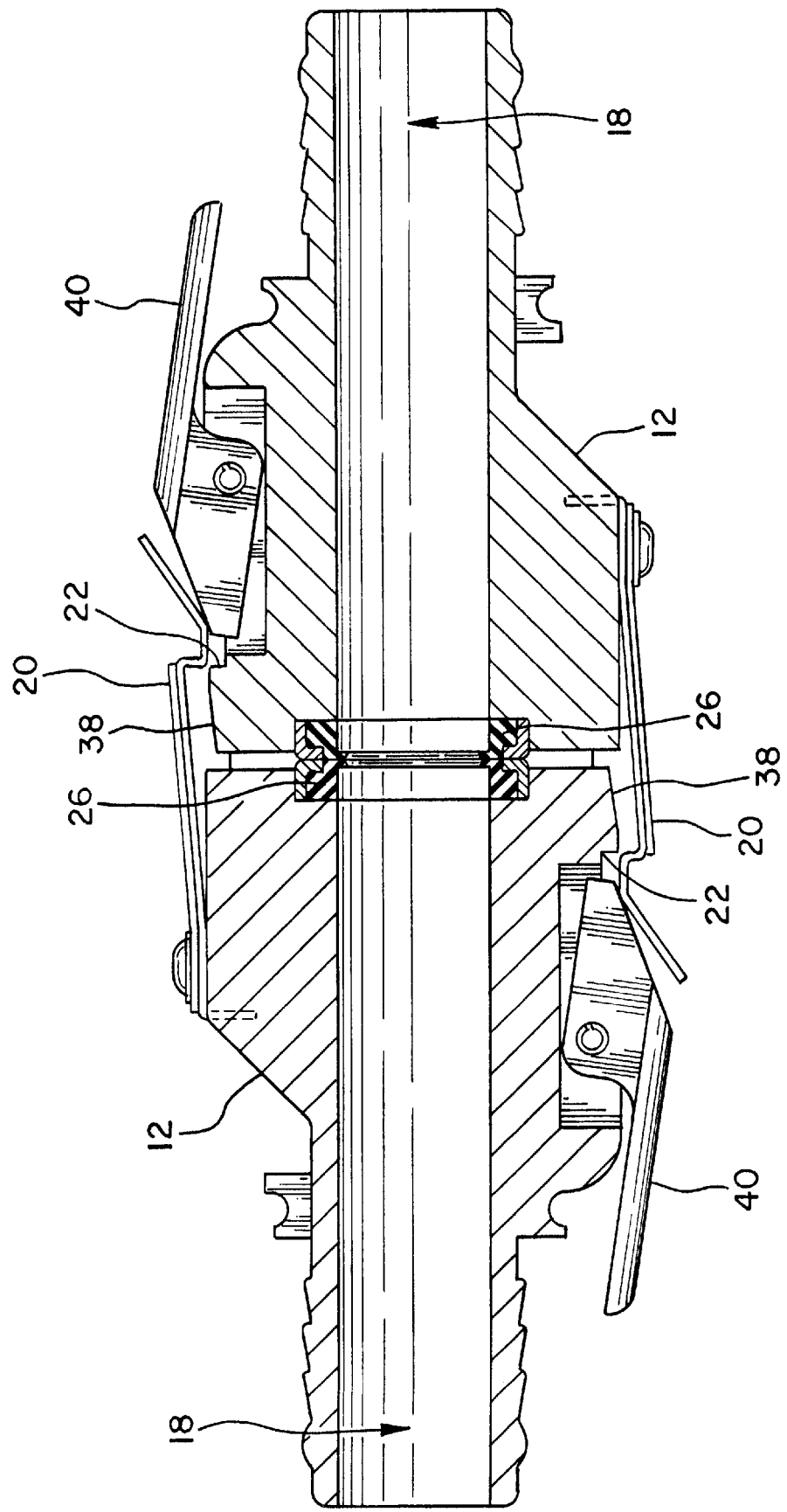
FIG. 4 is a cross sectional top view of the connectors of FIG. 2.

Once the connectors are mated, they may be disconnected by manually deflecting the latch spring 20 out of the inset notch 22 using the release lever 40 as illustrated in FIG. 4. so that the connectors may be separated by hand. Alternately, the two connectors may be separated by pulling them apart with a prescribed axial force. The amount of axial force required to separate the connectors is determined by the stiffness of the latch springs 20 and the shape of the inset notches 22. For most rail car connections it will be desirable to have the connectors remain together until experiencing an axial force of approximately three hundred pounds when the air lines are pressurized. At this point, latch springs 20 will have deflected sufficiently so as to come out of engagement with the inset notches 22 in the connector bodies.

Figure 5:
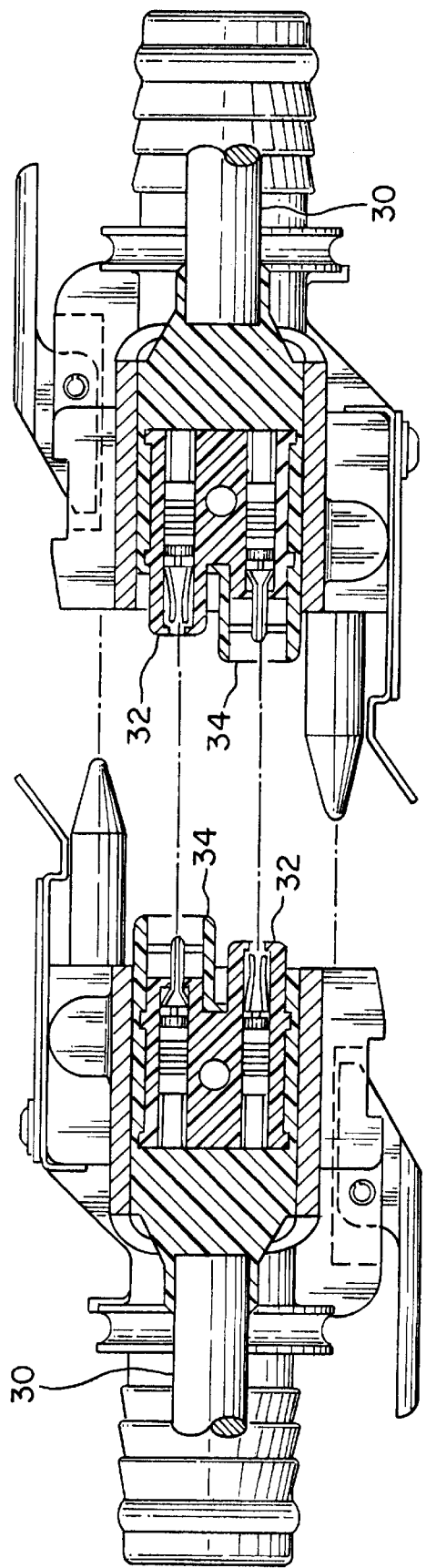
FIG. 5 is a cut-away view of the connectors of FIG. 2 showing a pair of the electrical contacts.

Referring now to FIG. 5, construction of the electrical contacts 32 and 34 will be described in greater detail. Contacts 32 are constructed to mate with contacts 34 so that when two connectors 10 are joined together the electrical contacts will also mate. In this way power and other electrical signals may be passed through conductors 30.

Although the foregoing invention has been described in detail by way of illustration and example, for purposes of clarity of understanding, it will be obvious that certain changes and modifications may be practiced within the scope of the appended claims.

What is claimed is:

1. A connector system comprising:
    a first and a second connector, each connector being hermaphroditic and comprising a connector body having a central axis, wherein each connector further includes a latch spring that is generally aligned with the central axis and includes an offset oriented generally toward the central axis, a lead-in ramp and an inset notch which is oriented generally toward the central axis on a side of the connector body generally opposite to the latch spring;
    wherein the first and the second connectors may be connected by abutting the corrector bodies, with each latch spring being received over the lead-in ramp on the abutting connector and engaging with the inset notch on the abutting connector; and
    wherein each connector includes a pivotal lever to deflect the latch spring sufficient to disengage the offset from the insert notch.

2. A system as in claim 1, wherein each latch spring is biased toward the central axis and the inset notch is shaped appropriate to control the amount of force required to allow the offset to move out of engagement with the inset notch to allow the two connectors to be pulled apart.

3. A system as in claim 2, wherein each latch spring and inset notch are configured to keep the connectors abutted until pulled apart with a force that is greater than about 300 pounds per square inch.

4. A system as in claim 1, wherein each connector body includes a central lumen, and wherein each connector body is connected to an air hose, with the air hose being aligned with the central lumen.

5. A system as in claim 1, wherein each connector body includes a resilient gasket aligned with the central lumen, wherein a seal is formed between the two lumens upon connection of the connector bodies.

6. A system as in claim 1, wherein the first and the second connectors are substantially identical to each other.

7. A system as in claim 1, wherein each connector further includes a signal contact, wherein the signal contacts are joined together upon connection of the connectors.

8. A system as in claim 7, wherein the signal contacts are selected from the group of signal contacts consisting of electrical contacts and fiber optic contacts.

9. A system as in claim 1, wherein each connector body further includes at least one alignment pin which aligns the connector bodies during connection.

10. A method for coupling a pair of connectors, the method comprising:
    providing a first and a second connector which are hermaphroditic, each connector comprising a connector body having a central axis, wherein each connector further includes a latch spring that is generally aligned with the central axis and includes an offset oriented generally toward the central axis, a lead-in ramp and an inset notch which is oriented generally toward the central axis on a side of the connector body generally opposite to the latch spring;
    abutting the connector bodies of the first and the second connectors, with each latch spring being received over the lead-in ramp on the abutting connector and engaging with the inset notch on the abutting connector; and
    actuating a pivotal release lever on at least one of the connectors to deflect the latch spring sufficient to disengage the offset from the inset notch, and manually separating the connectors.

11. A method as in claim 10, further comprising separating the connectors by pulling on the connectors with a force of at least 300 pounds per square inch.

12. A method as in claim 10, wherein each connector body includes a central lumen, and further comprising passing compressed air through the lumens after coupling the connectors.

13. A method as in claim 10, further comprising providing a signal contact on each connector, the signal contacts being joined upon connection of the connectors, and further comprising passing a signal through the contacts.

14. A method as in claim 13, wherein the passing step comprises passing an electrical signal through the contacts.

15. A connector system comprising:

a first and a second connector, each connector being hermaphroditic and comprising a connector body having a lumen for passing fluids, a signal contact, a latch member, and a latch mechanism generally opposite to the latch member;

wherein the first and the second connectors may be connected by abutting the connector bodies, with each latch member being releasably engaged by the latch mechanism on the abutting connector, wherein the lumens are aligned with each other and the signal contacts are joined together upon connection of the connectors, and wherein the first and the second connectors are separable by pulling the connectors apart to release the latch members from the latch mechanisms without sacrifice of either of the connectors.

16. A system as in claim 15, wherein each connector body includes a resilient gasket aligned with the lumen, wherein a seal is formed between the two lumens upon connection of the connector bodies.

17. A system as in claim 15, wherein the first and the second connectors are substantially identical to each other.

18. A system as in claim 17, wherein the signal contacts are selected from the group of signal contacts consisting of electrical contacts and fiber optic contacts.

19. A method for coupling a pair of connectors, the method comprising:

providing a first and a second connector, each connector being hermaphroditic and comprising a connector body having a lumen for passing fluids, a signal contact, a latch member, and a latch mechanism generally opposite to the latch member;

abutting the first and second connectors, with the lumens being generally aligned with each other; and pushing the first and the second connectors together until each latch member engages the latch mechanism on the abutting connector and the signal contacts are joined together.

20. A method as in claim 19, further comprising passing compressed air through the lumens after coupling the connectors, and passing a signal through the signal contacts.

* * * * *